Patented Mar. 29, 1949

2,465,592

UNITED STATES PATENT OFFICE 2,465,592

PROCESS FOR THE TREATMENT OF SCRAP LEATHER

Emil Karlson and Harold E. Karlson, Quakertown, Pa.

No Drawing. Application March 17, 1947, Serial No. 735,248

14 Claims. (Cl. 260—112)

1

This invention relates to the treatment of scrap leather, leather shavings or buffings and in general of scrap pieces of leather originating in and forming a waste material of a leather or leather object manufacturing process and it has for its main object the recovery of fats and dyes from said waste material and the production of a "leather extract" or "leather solution," so called, which is used for filling holes in sole leather or in other leather objects.

Scrap leather as well known is available in great quantities and is rather imperfectly utilized so that notable quantities go to waste. Assorted scrap leather pieces are utilized for the making of various leather goods and moreover various methods have been proposed to produce webs or pieces from small scrap leather pieces, using as a rule glueing or cementing processes and auxiliary or base materials of a different kind which webs or pieces may then be used as a leather substitute.

In addition to this mechanical type of scrap leather treatment, chemical treatment methods have been suggested for fat recovery and other purposes which however have mostly not been successful, except during periods of shortages, as they are relatively complex and costly. So-called "leather extracts" or "leather solutions" also, have been made by special processes which are capable of producing a hard filling for leather when dried. The process of making such "leather solutions" has however, as a rule, not been coupled with processes attempting the recovery of further useful substances from scrap leather.

It is the object of the present invention to provide a simple, effective and inexpensive process by means of which materials incorporated into the scrap leather and considered as valuable may be recovered. At the same time a "leather extract" or "leather solution" of the desired quality is produced. Further treatment yields dyes of several colors, preferably of brown and yellow color. In this way the scrap leather may be utilized to an extent which has not been obtainable by processes such as known in the prior art.

The process according to the invention consists of a plurality of stages and is essentially a process carried out partly within an autoclave. In one of the stages or phases the scrap leather placed into the autoclave is mainly treated with alkaline solutions; in another step treatment with strong acids may follow. The result of these two steps is either the production of the "leather solution" or "leather extract" and the recovery

2 of fats or the production of a dye, according to the way in which the second step has been carried out. If the product of the two first steps is further treated with acids a differently colored dye may be obtained. This process may be preceded by a preliminary fat recovering step which permits the recovery of fats even in the case in which the following process may, for instance, be a dye producing process.

In order to carry out the above described steps the scrap leather pieces, after having been cleaned in warm water, if necessary, are placed into an autoclave. This autoclave is in itself of the customary construction, but is provided with a stirring or mixing mechanism which is capable of rotating at about twenty revolutions per minute as a minimum. It is moreover provided with an opening for introducing the scraps, and with the customary sealing means, safety valve, thermometer, pressure gauge, etc. Moreover near the bottom it is provided with two discharge openings or pipes, of different size, closable by means of valves or spigots. Through the small pipe samples may be withdrawn at regular intervals. Through the larger opening discharge takes place at the completion of the process.

Into this autoclave the scraps and water are introduced, the quantity of water used corresponding in weight to between about 50% to 150% of the weight of the scrap leather to be treated. In addition NaOH or KOH are introduced, the weight of the lye varying from between 1% to 10% of the weight of the scrap leather.

The autoclave is then sealed and is placed under steam pressure which may vary between 15 and 135 lb./sq. in., the temperatures corresponding to these pressures being between 250°–360° F.

The treatment of the scrap leather in the autoclave continues for a period varying between two and ten hours which depends on the circumstances such as the steam pressure applied and the quality of the leather. The treatment is continued until the solution is approximately neutral or is only of a slightly alkaline character with a pH value of 6 to 7. The solution obtained at the end of the process must completely dissolve in water and this fact may be used as an indication or test of the completion of the first stage of the process. During this entire process as will be clear the mixer or stirring apparatus of the autoclave has been permanently operated.

When the first stage of the process has been completed a solution has been obtained which is now treated further, this further treatment forming the second stage. The solution obtained by the above described treatment in the autoclave is now filled into containers which are preferably glass or porcelain containers. Instead of these containers metal containers coated with enamel may be used. It is preferable to use containers which are partly closed and partly provided with a removable lid. The closed portion of the cover of the container may in this case be provided with ports or openings and the usual closable connections or pipes for introducing fluids and for exhausting and removing gases may be provided in this portion. The removable lid may be provided with a glass window for observing the process.

The container should again be provided with means for mixing the contents, preferably the customary stirring or mixing apparatus with around twenty-five revolutions per minute, which in this case has to be made of acid resistant material.

At the base of the container a discharge opening is provided for communication with the usual discharge pipe which is provided with a valve or spigot. The solution after completion of the process is drained through this pipe.

For the said second stage the containers are filled only partially on account of the increase of volume which the solution undergoes during the process. The solution may be filled in while hot, such as it comes from the autoclave. In this case it is first allowed to cool down. During this cooling process some of the fats will segregate and will float on the top. These fats are first removed.

The further processing of the solution is performed by means of nitric acid ($HNO_3$). The quantity varies with the concentration and other circumstances. After addition of the nitric acid the mixture is stirred with the mixing apparatus built into or inserted into the container as above described for a period of several hours during which period the temperature rises above the boiling point of water. Vapors will be developed during the process which have to be exhausted through the exhaust pipe. The vapors are poisonous and suitable provisions have to be made to avoid contact of the vapors with the persons operating the plant.

After the process has been terminated the solution starts to cool again. The fats now have been segregated and float on top. They are removed and the solution is now neutralized with some alkaline solution and is finally filtered in one of the customary filtration apparatus.

In the course of this filtering process all the fats still suspended in the solution and all undissolved particles are removed. The solution has now a yellow color and is practically ready to act as a "leather extract" or "leather solution," so called, that is as a solution which permits to fill leather.

If it is intended to make a dye and more specifically a brown dye, the second stage as above described is carried out in a somewhat different fashion while the first stage remains completely unchanged.

In this case the solution coming from the autoclave is first filtered in one of the customary filtration apparatus until all undesirable solid or undissolved particles are removed. The $HNO_3$ which in this case may be substituted by $H_2SO_4$ or by some other acid is then added. Upon addition of the acid solid particles will be formed which will segregate so that the solution will appear to have divided itself. These solid particles are removed, are subjected to a washing process in water and are thereafter dissolved in an alkaline solution such as NaOH or KOH. This solution is then placed into a hermetically sealed dryer which is equipped with a vacuum pump. It is subjected to a temperature of say 212° F. which temperature is gradually decreased during the drying process to around 60° F. When all moisture has been removed the product consists of solids which are then pulverized. This powder forms a brown dye which may then be used in the customary manner.

In order to obtain a yellow dye the same process as above described is used starting however with the solution which was obtained at the end of the second stage.

All the fats which are recovered in the various stages are purified in the customary way and are usable for industrial purposes.

For the recovery of industrial fats from scrap leather a preliminary or advance stage may be used which may precede the first stage as above described. The scrap leather in this case is placed in the autoclave and water is added the same as described in the first stage. Then steam is admitted and the contents of the autoclave are treated under pressure for several hours. During this phase the fats and also the tanning acids are mixed with the liquid. The latter are separated through the lower outlet of the autoclave as they settle on the bottom of the autoclave, when the contents are allowed to cool down. The fat floats on the top of the solution and may be removed. The scrap leather which has not been dissolved is now treated according to one of the processes as above described.

Several examples of the process are given below.

*Example 1*

The scrap leather, if soiled or carrying foreign matter, is first subjected to a washing process in warm water. During this process the leather will absorb some water. The scrap leather has therefore to be weighed after the washing process to determine the quantity absorbed. This quantity has to be deducted from the quantities mentioned below which are stated for clean scrap leather not needing a separate washing process.

To the scrap leather which is placed into an autoclave a quantity of water is added equal to about 50%–150% of the scrap leather weight. The quantity varies with the quality of the leather and other varying circumstances. NaOH or KOH is now added its weight varying from 1%–10% of the weight of the scrap leather placed in the autoclave. After these materials have been introduced the autoclave is hermetically sealed and is set under steam pressure which may vary between 15 lb./sq. in. and around 135 lb./sq. in. The temperature under these conditions will vary between 250° F. and 360° F.

The scrap leather is treated in the autoclave for a period varying between two to ten hours, the time depending among other things on the quality of the leather, on the quantity of alkali which was added and on the steam pressure applied. During this time the mixer is continuously rotating at a speed of about twenty revolutions per minute. From time to time at regular intervals samples of the liquid are withdrawn and are tested. When the first phase of the process reaches its final stage the solution must be neutral or have a very slight alkalinity, corresponding to a pH of a value of 6–7. When a further test shows a complete dissolving of the solution in water the first stage of the process may be considered as completed. The solution may then be withdrawn from the autoclave and is now further treated according to Example 2 or according to Example 3.

*Example 2*

The solution is withdrawn from the autoclave and is filled into containers coated with enamel and the containers are only partially filled. The fat floating on the surface is removed and collected and nitric acid $HNO_3$ of 65% is added. The weight of the nitric acid may vary from around 15% of the weight of the solution to around 35%. The mixture is stirred by means of the mechanical mixer and this operation continues for about one to two hours until the exhalation of vapors stops. The temperature during this process is around 212° F.–270° F. It maintains itself without addition of heat. The reaction and especially the development of vapors should be observed through an observation window. When the smoking has stopped the solution is left to cool with the fats which have been segregated settling and floating on top. These fats are now removed and collected.

The solution is tested and is neutralized with the proper amount of an alkaline solution. When neutralization has been reached the solution is passed through a filtration apparatus for removing any fats which have not been removed previously and all particles which have not been dissolved. The solution which has a yellow color is now ready for use as a "leather extract."

*Example 3*

The solution which has been obtained in the manner described in Example 1 is filtered and $HNO_3$ is added in the proportion above stated in Example 2. From the solution which now contains solids and a liquid, the solids are removed and are washed in water. After washing they are dissolved in alkali, for instance NaOH, and placed in a vacuum drier connected with a pump. The temperature in the drier which is originally around 212° F. is reduced to around 59° F. during drying.

The treatment in the drier removes the moisture so that a dry product is obtained. This product is now pulverized by the customary means and forms a brown dye stuff. The quantity of brown dye stuff produced will be about sixty pounds for each one hundred pounds of scrap leather introduced into the autoclave. The dye stuff is mainly used for leather dyeing and for wood staining.

*Example 4*

The process described in Example 3 is repeated taking however the solution obtained in Example 2 as a starting material. This process furnishes a yellow dyestuff.

*Example 5*

One thousand pounds of calf leather scraps are first washed in warm water and the quantity of water they have absorbed is determined.

These scraps are now placed in an autoclave and water in a quantity equal to one thousand pounds minus the quantity of water absorbed during the washing process is added. Fifty pounds of NaOH (concentration 98%), corresponding to about 5% of the scrap leather weight, is added. The autoclave is sealed and is placed under steam pressure, the pressure being 45.3 pounds per square inch. The temperature to which the scrap leather is exposed under these conditions is 292° F. The treatment in the autoclave continues for six hours.

As in the previous examples, samples of the liquid in the autoclave are periodically withdrawn and submitted to the tests as above described. At the end of the treatment process about two thousand pounds of a water dissolving liquid is obtained. This liquid has a very slight alkalinity corresponding to a pH value of about 7.

The two thousand pounds of liquid are now filled into enamel coated containers. Five hundred pounds of nitric acid, such as customarily and commercially available, having a concentration varying between 65% and 67% are now added. This corresponds to around 25% of the weight of the solution. The weight varies mainly with the weight of the water originally introduced into the autoclave with the scraps. The process now continues exactly as stated in Example 2 at a temperature of 220° F.

*Example 5a*

The liquid (weight 2000 pounds) may be vaporized before treatment with the nitric acid and used in this state. In this case only one hundred fifty pounds of $HNO_3$ have to be added. The temperature during this process should not surpass 220° F. The weight of the nitric acid will in this case only be 15% of the weight of scrap leather introduced into the autoclave.

*Example 6*

A quantity of scrap leather is introduced into an autoclave and a quantity of water approximating in weight around 50% to 150% of the weight of the scraps is added. Steam under a pressure of around 135 pounds per square inch is introduced and the scraps are boiled for three to four hours. During this time the tanning acids and fats are separated from the scraps and are dissolved in the water. The liquid while still hot is withdrawn by means of the discharge pipe at the bottom of the autoclave. This liquid is cooled during which process the fats will collect on top of the liquid. They are then removed for purification and further use. The undissolved scraps remaining in the autoclave are then treated in accordance with Example 1.

It will be clear that in the treatment of a material of such a varying quality as scrap leather the various steps will vary in conformity with the nature of the material. The invention has been described by means of such examples as will illustrate the principles used, and modifications of the process based on the same principles will be obvious to those skilled in the art. Modifications are therefore not necessarily departures from the essence of the invention.

We claim:

1. In a process for treating scrap leather, using an autoclave, for the removal of fat and for a dyestuff, the step of treating the scrap material within said autoclave, with water and an alkaline lye in the presence of steam under pressure and while stirring constantly until approximately neutrality of the solution in the autoclave is obtained, and until the solution dissolves completely in water, and after removal of the solution from the autoclave the further steps of adding an acid, of removing the solids produced, of washing the same, of dissolving said solids in an alkaline solution, and of subjecting them to vacuum drying.

2. In a process for treating scrap leather, using an autoclave, for the removal of fat and for a dyestuff, the step of treating the scrap material within said autoclave, with water and an alkaline lye in the presence of steam under pressure and while stirring constantly until approximate neutrality of the solution in the autoclave is obtained and until the solution dissolves completely in water and, after removal of the solution from the autoclave, the further steps of filtering the solution, of adding nitric acid, of removing the solid particles formed by the said addition, of washing the same and of dissolving the same in an alkaline solution, of treating the said solution in a vacuum drier under a falling temperature and of pulverizing the substance obtained after removal of the moisture.

3. In a process for treating scrap leather, using an autoclave, for the removal of fat and for a dyestuff, the step of treating the scrap material within said autoclave, with water and an alkaline lye in the presence of steam under pressure and while stirring constantly until approximate neutrality of the solution in the autoclave is obtained, and until the solution dissolves completely in water, and after removal of the solution from the autoclave, the further steps of treating the solution with nitric acid under constant stirring until the exhalation of vapors stops, of cooling the solution, of neutralizing the solution with an alkali, of filtering the solution, of adding an acid to said solution, of removing the solid particles formed by the said addition, of washing the same and of dissolving the same in an alkaline solution, of treating the said solution in a vacuum drier under a falling temperature and of pulverizing the substance obtained after removal of the moisture.

4. In a process for treating scrap leather in an autoclave, for the removal of fats and for the production of a leather solution, the step of adding to the scrap material water in a quantity exceeding one half of the weight of the scrap material, of adding an alkaline lye in a quantity exceeding $\frac{1}{10}$ of the weight of the scrap material in the presence of steam of a pressure exceeding 15 lb./sq. in. in treating the solution while stirring the solution constantly, during a period exceeding two hours, until approximately neutral, in filtering the solution thus obtained in further treating the solution obtained with nitric acid, in removing the solids produced by this treatment, in washing the same and in dissolving the same in an alkaline solution, in subjecting the same to a vacuum drying process using a temperature of approximately 212° F. at the beginning of the vacuum drying process, in reducing said temperature to a temperature of approximately 59° F. during said drying process and in pulverizing the product obtained after complete removal of moisture.

5. In a process for treating scrap leather in an autoclave, for the removal of fats and for the production of a leather solution, the step of adding to the scrap material water in a quantity exceeding one half of the weight of the scrap material, of adding an alkaline lye in a quantity exceeding $\frac{1}{10}$ of the weight of the scrap material in the presence of steam of a pressure exceeding 15 lb./sq. in., in treating the solution while stirring the solution constantly during a period exceeding two hours, until approximately neutral, in further treating the solution after removal from the autoclave with nitric acid in a quantity exceeding 15% of the weight of the solution treated during a period exceeding one hour until smoking stops, in cooling the solution in removing the fats which have segregated during the above process, in neutralizing the said solution by the addition of alkali, in filtering the solution thus obtained in further treating the solution obtained with nitric acid, in removing the solids produced by this treatment, in washing the same and in dissolving the same in an alkaline solution, in subjecting the same to a vacuum drying process using a temperature of approximately 212° F. at the beginning of the vacuum drying process, in reducing said temperature to a temperature of approximately 59° F. during said drying process and in pulverizing the product obtained after complete removal of moisture.

6. A process of treating scrap leather for the removal of fats and the production of a leather extract comprising; heating with constant stirring an aqueous mixture of the scrap material under pressure in the presence of an alkali until the mixture attains a pH of 6–7, filtering the mixture, adding nitric acid to the filtrate, withdrawing the separated fats, neutralizing the defatted filtrate, and recovering a neutral, substantially clear leather extract.

7. The process of claim 6 wherein said alkali is NaOH.

8. The process of claim 6 wherein said alkali is KOH.

9. The process of claim 6 wherein said alkali is present in the amount of 1% to 10% by weight of the scrap leather.

10. The process of claim 6 wherein the aqueous mixture of the scrap material is heated at a temperature of 250° to 360° F. and under a pressure of 15 to 135 pounds per square inch.

11. The process of claim 6 wherein the nitric acid is added in the amount of 15% to 35% by weight of the filtrate.

12. A process of treating scrap leather for the removal of fats and the production of a leather extract comprising; heating with constant stirring at a temperature of 250° to 360° F. an aqueous mixture of the scrap material under a pressure of 15 to 125 pounds per square inch in the presence of an alkali until the mixture attains a pH of 6–7, filtering the mixture, adding nitric acid in an amount of 15% to 35% by weight of the filtrate, withdrawing the separated fats, neutralizing the defatted filtrate, and recovering a neutral, substantially clear leather extract.

13. The process of claim 12 wherein the alkali is NaOH.

14. The process of claim 13 wherein the alkali is KOH.

EMIL KARLSON.
HAROLD E. KARLSON.

REFERENCES CITED

The following references are of record in the file of this patent:

UNITED STATES PATENTS

| Number | Name | Date |
|---|---|---|
| 2,137,365 | Strong et al. | Nov. 22, 1938 |
| 2,164,798 | Campbell | July 4, 1939 |

FOREIGN PATENTS

| Number | Country | Date |
|---|---|---|
| 341,264 | Germany | Sept. 29, 1921 |